Aug. 2, 1966

N. A. RABELOS ET AL 3,263,266

VERTICAL PRESSURE SWIVEL CASTER

Filed March 27, 1964

Nicholas A. Rabelos
Donald E. Robert
INVENTORS

BY *Clarence A. O'Brien*
*and Harvey B. Jacobson*
Attorneys

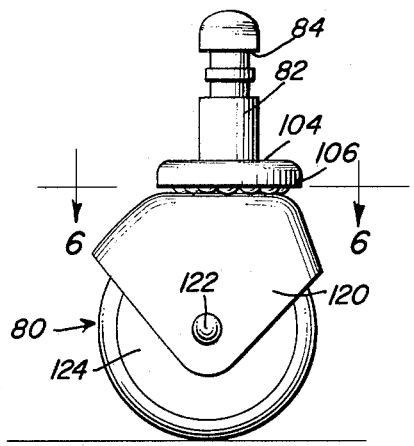
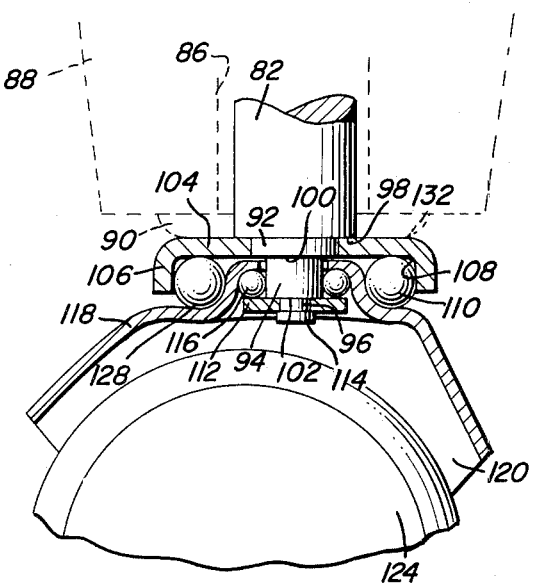
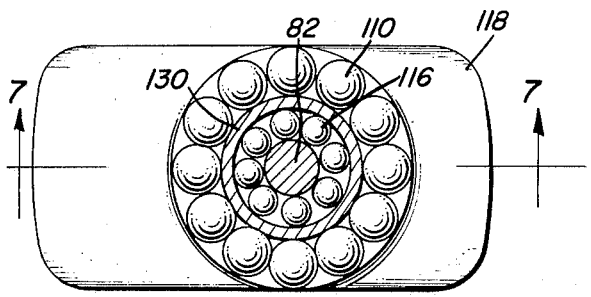
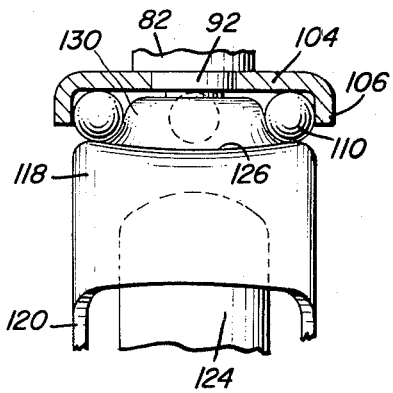
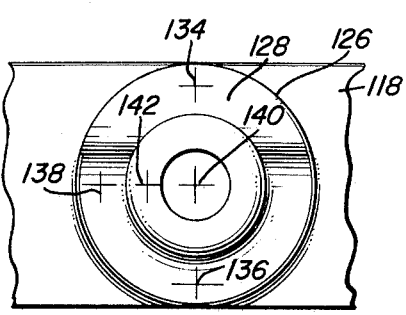

United States Patent Office 3,263,266
Patented August 2, 1966

3,263,266
VERTICAL PRESSURE SWIVEL CASTER
Nicholas A. Rabelos, 2448-A Morosgo Way NE., Atlanta, Ga., and Donald E. Robert, Fulton, Ga. (3123 Robin Road, Decatur, Ga.)
Filed Mar. 27, 1964, Ser. No. 356,021
5 Claims. (Cl. 16—44)

The present invention generally relates to novel and improved caster assemblies for use in supporting various types of furniture and particularly that type of furniture subject to movement over a floor surface or the like and this application is a continuation in part of co-pending application Serial No. 273,399, filed April 16, 1963, now abandoned, for an Irretractable and Retractable Vertical Pressure Swivel Caster.

Swivel casters, as such, are known and have been employed for a number of years in conjunction with various articles of furniture so that the furniture may be rollingly supported on a floor surface or the like to facilitate movement thereof from one position to another. Generally, the caster is constructed with the rotational axis of the caster wheel substantially offset in relation to the swivelling axis of the caster yoke whereby the caster will swivel so that the caster wheel trails the swivel axis during movement of the article of furniture in a particular direction. Due to rust, dirt, wear and other factors, the swivelling operation of the casters quite often is impaired due to the fact that the swivel axis or swivel pin quite often becomes jammed or otherwise fixed due to the offset pressure exerted thereon caused by the offset orientation of the rotational axis of the caster. Therefore, it is one of the major objects of the present invention to provide a caster assembly in which the rotational axis of the caster wheel is within the confines of the bearing assembly of the caster yoke thereby eliminating side forces and wear caused by the normally provided offset axis of rotation of the caster wheel. This orientation also facilitates movement of the article of furniture with very little initial lateral movement which is caused by the conventional swivelling movement of conventional casters.

Another important object of the present invention is to provide a caster assembly which is mounted on a furniture supporting leg by virtue of a compression spring whereby the caster assembly will be retracted in relation to the furniture leg when weight is placed on the furniture such as a person sitting on a chair, couch or the like thereby enabling the weight of such person or persons to be distributed over a relatively larger area of the lower end of furniture legs rather than being transferred to the floor surface through only the caster wheel.

A further object of the present invention is to provide a caster wheel which may be either retractable or irretractable and provided with the vertical pressure only exerted on the supporting yoke for the caster wheel.

A most important object of the present invention is to provide a caster wheel assembly having a novel bearing assembly disposed between the swivel yoke and the non-rotatable part or frame of the assembly to facilitate swivelling movement of the caster yoke upon exertion of a very slight amount of torque about its rotational axis. The bearing assembly includes an outer ball bearing assembly including a continuous race and a plurality of relatively small ball bearings therein together with an inner ball bearing race having a single large ball bearing therein together with a facing member on the yoke having a single recess therein receiving the large ball bearing and provided with a generally concave surface engaging the continuous row of ball bearings as well as the single large ball bearing to initiate more readily the swivelling action of the yoke.

Another very important object of the present invention is to provide a caster wheel assembly having a novel bearing assembly disposed between the swivel yoke and the non-rotatable part of the assembly to facilitate swivelling movement of the caster yoke upon exertion of a very slight amount of torque about its rotational axis. The bearing assembly includes an outer ball bearing assembly and an inner ball bearing assembly orientated with the centers thereof in radial alignment and disposed in substantially the same horizontal plane with the stationary parts of the assembly forming an outer race for the outer ball bearing assembly and an inner race for the inner ball bearing assembly and with the yoke having an inwardly facing race and an outwardly facing race for positioning between the two ball bearing assemblies with the outer ball bearing assembly having a plurality of balls of considerably greater diameter than the inner ball bearing assembly. The race for the outer ball bearing assembly formed in the yoke is provided with a concave curvature which extends laterally of the top surface of the yoke and is symmetrical about a longitudinal axis thereof for providing an initial torque when pressure is exerted on an article of furniture so that the caster wheel will be swivelled to the desired position with the application of very little force.

Another feature facilitating swivelling movement of the yoke is the provision of a slightly elongated opening in the depending legs of the yoke for receiving the axle pin of the caster wheel to enable a slight degree of relative movement between the caster wheel and yoke to further enable initial movement of the caster wheel about its swivelling axis. Also, the caster wheel is constructed with a rounded peripheral surface insofar as its transverse configuration is concerned to further facilitate initial swivelling movement of the caster about its swivelling axis.

Yet another important feature of the present invention is to provide a caster wheel assembly in which vertical pressure only is exerted by the caster wheel and the yoke is in the form of a hollow apron formed of a single piece of material in which the caster wheel is journalled. The caster wheel is provided with a rounded surface which combines with the concave surface of a outer bearing race on the yoke which will cause easy swivelling movement of the caster wheel upon application of very little force.

Still another important object of the present invention is to provide a caster assembly which is simple in construction, easy to install, quite efficient in operation, long lasting and subject to very little wear, highly efficient for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a side elevational view of another form of caster wheel;

FIGURE 6 is a plan sectional view taken substantially upon a plane passing along section line 6—6 of FIGURE 5 illustrating the structural details of the inner and outer bearing assemblies which swively support the swivel yoke;

FIGURE 7 is a vertical sectional view taken substantially upon a plane passing along section line 7—7 of FIGURE 6 illustrating further structural details and relationship of the inner and outer bearing assemblies, the races therefor and the orientation of the centers of the ball bearings in the inner and outer races;

FIGURE 8 is a transverse sectional view of the outer race for the outer bearing assembly with the yoke being shown in elevation for illustrating the concavity of the upper surface of the yoke which forms the bearing race; and FIGURE 9 is a top plan view of a portion of the yoke illustrating the outer bearing race and further illustrating the points of application of pressure by the yoke on the ball bearing assembly.

Figure 1:
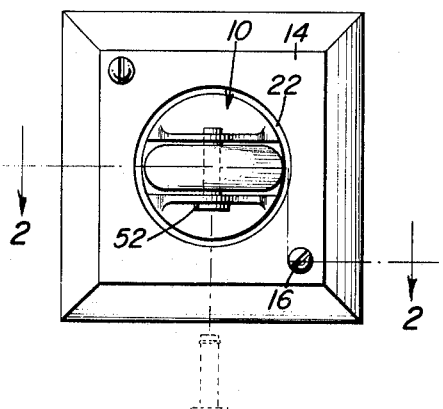
FIGURE 1 is a bottom plan view of a furniture leg illustrating the retractable caster wheel of the present invention installed therein.
Figure 2:
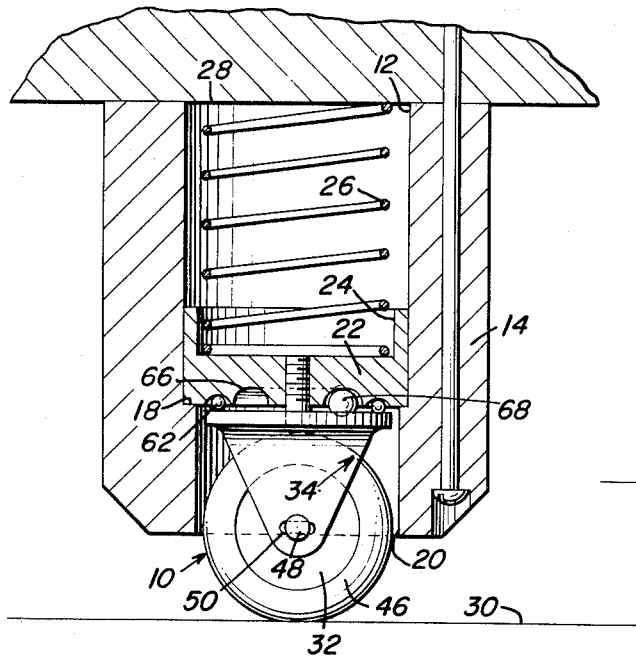
FIGURE 2 is a detailed sectional view taken substantially upon a plane passing along section line 2—2 of FIGURE 1 illustrating further structural details of this form of the invention.

Referring now specifically to the drawings, the numeral 10 generally designates the caster assembly of the present invention as illustrated in FIGURES 1 and 2 which is a retractable form of the invention and is mounted in a vertical bore 12 formed in a furniture leg 14 of any suitable construction with the furniture leg 14 being held onto the bottom of an article of furniture by elongated fasteners of the screw-threaded type or the like designated by numeral 16. The particular shape, size and configuration of the furniture leg 14 may vary and the leg 14 may be attached to any type of furniture desired. The interior of the furniture leg 14 having the bore 12 therein is provided with a shoulder 18 and a smaller bore 20 forming an extension of the bore 12 and communicating with the bottom surface of the furniture leg 14.

The caster assembly 10 includes a generally cup-shaped base member 22 slidably received in the bore 12 and normally resting against the shoulder 18. The upper surface of the cup-shaped base member 22 which may also be considered a slide is provided with a recess 24 forming a socket or cup for receiving the bottom end of a compression spring 26 which is disposed in the bore 12 and which has the upper end engaging the bottom surface of the article of furniture or a closure inserted into the bore 12 as indicated by numeral 28. Thus, the spring 26 will normally bias the base member 22 downwardly against the shoulder 18 but when sufficient pressure is exerted on the caster assembly 10 by the floor surface 30, the spring 26 will be compressed thereby enabling the base member 22 to slide upwardly into the bore 12 for enabling the caster assembly 10 to be retracted in relation to the leg 14 whereby the bottom surface of the leg 14 will come into contact with the floor surface 30 and thereby support the load on the article of furniture by distributing the load over a greater surface area formed by the lower end of the leg 14. This will reduce the tendency of the caster assembly forming depressions in the floor surface but still enable the caster assembly to effectively movably support the article of furniture to facilitate movement thereof over the floor surface.

Figure 3:
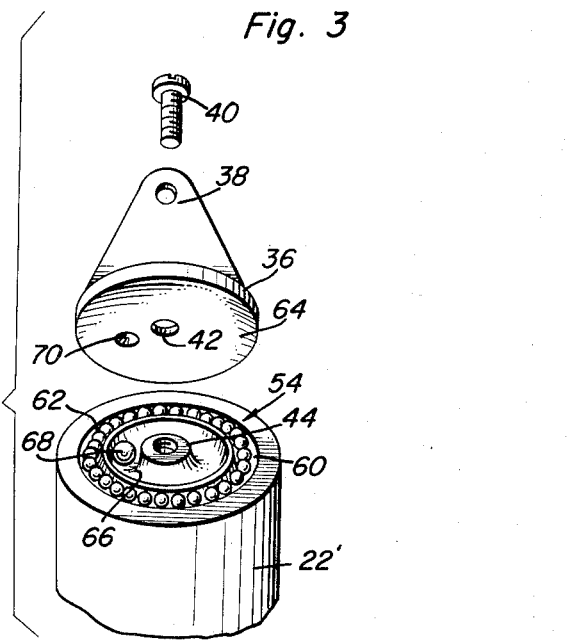
FIGURE 3 is an exploded group perspective view of the irretractable caster assembly with the assembly being inverted and having the yoke pivoted to expose the surface thereof engaging the ball bearing assembly.

The caster assembly 10 includes a caster wheel 32 and a generally inverted U-shaped yoke generally designated by numeral 34 and including a circular top member or plate 36 and a pair of depending parallel legs or flanges 38 which straddle the caster wheel 32 and form a yoke therefor. A screw-threaded retaining fastener 40 is inserted through a central aperture 42 in the circular plate 36 and is threaded into an internally threaded bore 44 in the base member 22 as illustrated in FIGURES 2 and 3.

The caster wheel 32 may be constructed of any suitable material such as metal, wood, plastics of various types such as a clear type of plastic to enhance the appearance thereof. The peripheral edge of the wheel 32 is rounded as at 46 whereby the cross-sectional configuration of the peripheral portion of the caster wheel 32 is generally semi-circular as illustrated in FIGURE 1. This facilitates swivelling movement of the caster assembly in a manner described in more detail hereinafter. The wheel 32 is journalled between the legs or flanges 38 by virtue of a pin or axle 48 extending therethrough. Each leg 38 has an aperture 50 therein receiving the axle or pin 48 with the apertures 50 being slightly horizontally elongated to enable a slight amount of shifting of the axle or pin 48 to further facilitate initial swivelling movement of the caster assembly. One end of the axle or pin 38 is provided with a head 52 and the other end thereof is provided with a snap lock-in type of connection with the opposite leg or flange. This construction includes a peripheral groove disposed slightly inwardly of the end of the pin opposite from the head 52 whereby the pin is slightly larger than the minor diameter of the aperture 50 for snapping into the aperture 50 wherein the pin will then be retained and has to be snapped in and out of position when it is desired to remove the caster wheel for replacement as may be desired or for removal of the screw-threaded fastener 40 when it is desired to disassemble the caster assembly.

Figure 4:
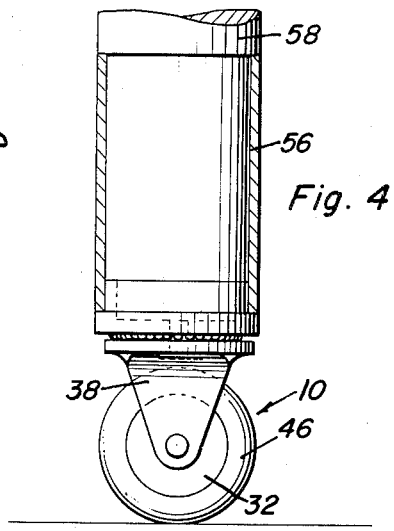
FIGURE 4 is a sectional view illustrating the manner of assembly of the irretractable caster assembly to a furniture leg.

A significant feature of the caster assembly resides in the bearing assembly generally designated by numeral 54 disposed between the plate 36 and the base member 22. Before describing the bearing assembly 54, it may be pointed out that the base member 22 may be of the retractable type as illustrated in FIGURE 2 or it may be of the irretractable type as designated by numeral 22' in FIGURES 3 and 4 in which the base member 22' is an integral part of a sleeve 56 which telescopes over the lower end of a furniture leg 58 in flush relationship and is secured thereto in any suitable manner whereby the caster assembly 10 is irretractable but otherwise the same as in the form of the invention illustrated in FIGURES 1 and 2.

The bearing assembly 54 includes an outer annular recess 60 formed in the downwardly facing surface of the base member 22 or 22' and the annular recess or groove 60 defines a race for a plurality of spherical ball bearings 62 which completely fill the race and which engage the smooth surface 64 of the plate 36. The smooth surface 64 is concave as illustrated in FIGURES 2 and 3 but does not have any annular groove for engaging the bearing members 62. Disposed inwardly of and concentrically of the groove 60 is a larger annular groove 66 which encircles the central threaded bore 44 and which receives a single spherical ball bearing 68 of larger diameter than the ball bearings 62 and the groove 66 is also larger in cross-sectional configuration than the groove 60. The single ball bearing 68 is engaged in and received in a single partial spherical recess 70 formed in the concave surface 64 of the plate 36 as illustrated in FIGURES 2 and 3.

When the screw-threaded member 40 is assembled, the fit between the aperture 42 and the fastener 40 is not too restricted in that the yoke 34 still can readily swivel and also slightly tilt and move slightly laterally in relation to the fastener 40. Of course, as wear occurs, this degree of movement will slightly increase. In any event, the concave smooth surface 64 of the plate 36 will always tend to centralize in relation to the ball bearing members 62 and the large ball bearing 68 will also tend to start and guide the initial movement of the yoke in relation to the base member 22. Thus, regardless of the condition and position of the yoke in relation to the base member 22, any torque or lateral thrust exerted on the yoke 34 will immediately be converted into swivel movement of the yoke so that regardless of the direction of lateral force exerted on the article of furniture, the caster assembly will immediately swivel so that all of the caster wheels are rotating about parallel axes for movement of the furniture in the desired direction.

FIGURES 5-9 illustrate another embodiment of swivel caster incorporating the principles of the present invention therein generally designated by numeral 80 and including a vertically disposed stem 82 having grooves 84 peripherally thereof with the stem 82 being detachably received within a furniture leg socket 86 of any suitable article of furniture 82 with there usually being provided a ferrule 90 or the like receiving the stem 82 for releasably retaining any suitable caster assembly in place.

The stem 88 is provided with three axial extensions 92, 94 and 96 which are of progressively reducing diameters thus forming shoulders 98, 100 and 102 disposed in axially spaced relation along the axis of the stem 82. The extension 90 receives a generally cup-shaped cap 104 having a downturned flange 106 which forms an outer race 108 for an outer ball bearing assembly 110 which has a diameter greater than the vertical dimension of the flange 106 whereby a portion of the bottom periphery of each of the ball bearings 110 extends below the bottom edge of the flange 106 and the top edge and outer edge of each ball bearing 110 engages the bottom surface of the cup 104 and the inner surface of the flange 106 in spaced relation to the juncture therebetween as illustrated in FIGURES 7 and 8.

The lowermost extension 96 receives a retaining washer 112 thereon which abuts against the shoulder 102 and the lower end of the extension 96 is deformed or peened outwardly as at 114 for permanently securing the washer 112 in place which serves to retain an inner assembly of ball bearings 116 in place. The ball bearings 116 are of lesser diameter than the ball bearings 110 and the bottom periphery of each ball bearing 116 engages the upper surface of the retaining washer 112 and the inner surface of each of the ball bearings 116 engages the outer surface of the cylindrical extension 94 as illustrated in FIGURE 7.

Interposed between the ball bearings 110 and the ball bearings 116 is a yoke 118 having depending parallel skirts 120 with a pin or axle 122 extending therebetween for journalling the caster wheel 124 thereon. The top portion of the yoke 108 is provided with an annular shoulder area 126 defining a bottom bearing race surface 128 for the outer ball bearings 110. At the inner end of the race 128, the yoke is provided with an upwardly curved flange 130 which forms an inner race for the ball bearing 110 as illustrated in FIGURES 7 and 8.

The upper end of the flange 130 is turned inwardly as at 132 to closely encircle the cylindrical extension 94 and overlie the ball bearing 116 to form a top bearing race for the inner ball bearings 116 and to also form an outer race for the inner ball bearing 116 as illustrated in FIGURE 7. The top and outer races for the inner ball bearings 116 are curved generally to conform to the radius of the ball bearings 116 while the bottom and inner race of the outer ball bearings 110 are curved generally to conform to the radius of the outer ball bearings 110 all as illustrated in FIGURE 7. Also, as illustrated, the centers of the ball bearings 110 and 116 are all orientated in the same horizontal plane and the ball bearings 110 and 116 are all retained in place by the stem 82 and its assembly with the retaining washer 112 and the yoke 118.

As illustrated in FIGURES 8 and 9, the shoulder 126 which forms the bearing race 128 is concave from side edge to side edge. In other words, the portions of the shoulder 126 which overlie the side flanges 120 are higher than the portions of the shoulder 126 aligned with the periphery of the wheel 124 which is generally semi-cylindrical in configuration. The shoulder 126 is symmetrical about a central plane passing through the center of the wheel in perpendicular relation to the axis of rotation thereof and this construction is significant inasmuch as when any force is exerted on the caster wheels such as when an article of furniture is pushed in one direction, there will be three points of supporting engagement between the ball bearing and the shoulder 126 with these three points being illustrated in FIGURE 9 and designated by numeral 134, 136 and 138. Of course, the force point 138 could be at the opposite side of the shoulder 126 depending upon the direction in which the article of furniture is pushed. The center force point is designated by numeral 140 and taking all of the force points and combining them, a central force point 142 will be defined which is actually the direction of force which is in a vertical direction and which will be supported by the ball bearing assemblies so that regardless of the force exerted, the ball bearing assemblies will readily enable swivelling movement of the caster wheel 124.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A caster wheel assembly comprising a vertically disposed stem, a cap carried by said stem, a yoke rotatably mounted on the stem, said yoke having an annular shoulder means defined thereon for forming a downwardly opening inwardly facing bearing race and an upwardly opening outwardly facing bearing race, a plurality of ball bearings between the cap and the outwardly facing race on the yoke and retained in place by said cap, a plurality of ball bearings between the inner race on the yoke and the stem, and means retaining the inner ball bearings in place.

2. The structure as defined in claim 1 wherein the outer ball bearings have a larger diameter than the inner ball bearings with the centers of the inner and outer ball bearings disposed in the same horizontal plane, said cap having a depending peripheral flange terminating in spaced relationship to the yoke with the space between the yoke and the edge of the flange being less than the diameter of the outer ball bearings for retaining the outer ball bearings in place.

3. The structure as defined in claim 2 wherein the outwardly facing ball bearing race on the yoke includes a generally horizontally disposed shoulder, said shoulder being concave symmetrically along only the longitudinal axis of the yoke in perpendicular relation to the axis of rotation of the caster wheel.

4. A caster wheel assembly comprising a vertically disposed stem, a cap carried by said stem, a yoke rotatably mounted on the stem, a caster wheel journaled in said yoke, said yoke having an annular shoulder means defined thereon for forming a downwardly opening inwardly facing bearing race and an upwardly opening outwardly facing bearing race, a plurality of ball bearings between the cap and the outwardly facing race on the yoke and retined in place by said cap, a plurality of ball bearings between the inner race on the yoke and the stem, and retaining means on the stem for retaining the inner ball bearings in place, said outwardly facing bearing race being provided with a pair of diametrically opposed concave surface areas thereby enabling a slight degree of lateral movement of the yoke when pressure is exerted on the caster wheel toward one of the concave areas, said concave areas being located in a vertical plane perpendicular to the axis of rotation of the caster wheel.

5. The structure as defined in claim 4 wherein the outer ball bearings have a diameter greater than the diameter of the inner ball bearings, the centers of the inner and outer ball bearings being disposed on substantially the same horizontal plane to preclude relative radial movement between the stem, cap, yoke and ball bearings.

References Cited by the Examiner

UNITED STATES PATENTS

| | | | |
|---|---|---|---|
| 1,259,103 | 3/1918 | Hutton | 16—44 |
| 1,488,824 | 4/1924 | Millet | 16—45 |
| 1,687,113 | 10/1928 | Stockdale | 16—45 |
| 2,468,399 | 4/1949 | Grossman | 16—18 |
| 2,502,759 | 4/1950 | Singer | 16—44 |
| 2,647,277 | 8/1953 | Christensen | 16—44 |
| 2,698,454 | 1/1955 | Meyer | 16—31 |
| 2,963,732 | 12/1960 | Kramcsak et al. | 16—21 |
| 2,980,944 | 4/1961 | Bolinger | 16—44 |

PATRICK A. CLIFFORD, *Primary Examiner.*

DONLEY J. STOCKING, *Examiner.*

D. L. TROUTMAN, *Assistant Examiner.*